United States Patent [19]

Moormann

[11] Patent Number: 4,887,812
[45] Date of Patent: Dec. 19, 1989

[54] BASKETBALL HOOP SYSTEM
[75] Inventor: Randall H. Moormann, Georgetown, Mass.
[73] Assignee: Tonka Corporation, Minnetonka, Minn.
[21] Appl. No.: 113,879
[22] Filed: Oct. 27, 1987
[51] Int. Cl.⁴ ............................................. A63B 63/08
[52] U.S. Cl. .............................. 273/1.5 R; 248/223.4; 248/231.3; 403/381
[58] Field of Search ......................... 273/1.5 R, 1.5 A; 248/223.4, 224.1, 224.2, 225.35, 227, 229, 231.3, 231.4, 231.6, 231.8; 446/450; 403/381

[56] References Cited
U.S. PATENT DOCUMENTS

| 275,771 | 4/1888 | Keith | 446/450 |
| 965,658 | 7/1910 | Reubel | 248/223.4 X |
| 1,516,859 | 11/1924 | Lantrip | 273/1.5 R |
| 1,531,614 | 3/1925 | Houston | 273/1.5 R |
| 2,512,417 | 6/1950 | Cook | 273/1.5 X |
| 2,517,463 | 8/1950 | Cobb | 273/1.5 R |
| 3,017,183 | 1/1962 | Chalcroft | 273/1.5 R |
| 3,840,944 | 10/1974 | Gresley | 248/223.4 X |
| 4,145,044 | 3/1979 | Wilson | 273/1.5 R |
| 4,715,600 | 12/1987 | Offutt | 273/1.5 R |

FOREIGN PATENT DOCUMENTS

| 17624 | of 1894 | United Kingdom | 403/381 |
| 162847 | 5/1921 | United Kingdom | 248/227 |
| 365734 | 1/1932 | United Kingdom | 248/227 |

Primary Examiner—Paul E. Shapiro
Attorney, Agent, or Firm—Donald Brown

[57] ABSTRACT

A basketball hoop and bracket for attaching the hoop to the upper edge of a door or other elevated structure embodying an upper edge over which the bracket can be suspended the bracket taking the form of a U-shaped hanger embodying spaced, parallel legs spaced apart a distance greater than the thickness of the door for mounting astride the upper edge of the door and a coupling element adjustably mounted to one leg of the hanger for clamping engagement with the door.

19 Claims, 3 Drawing Sheets

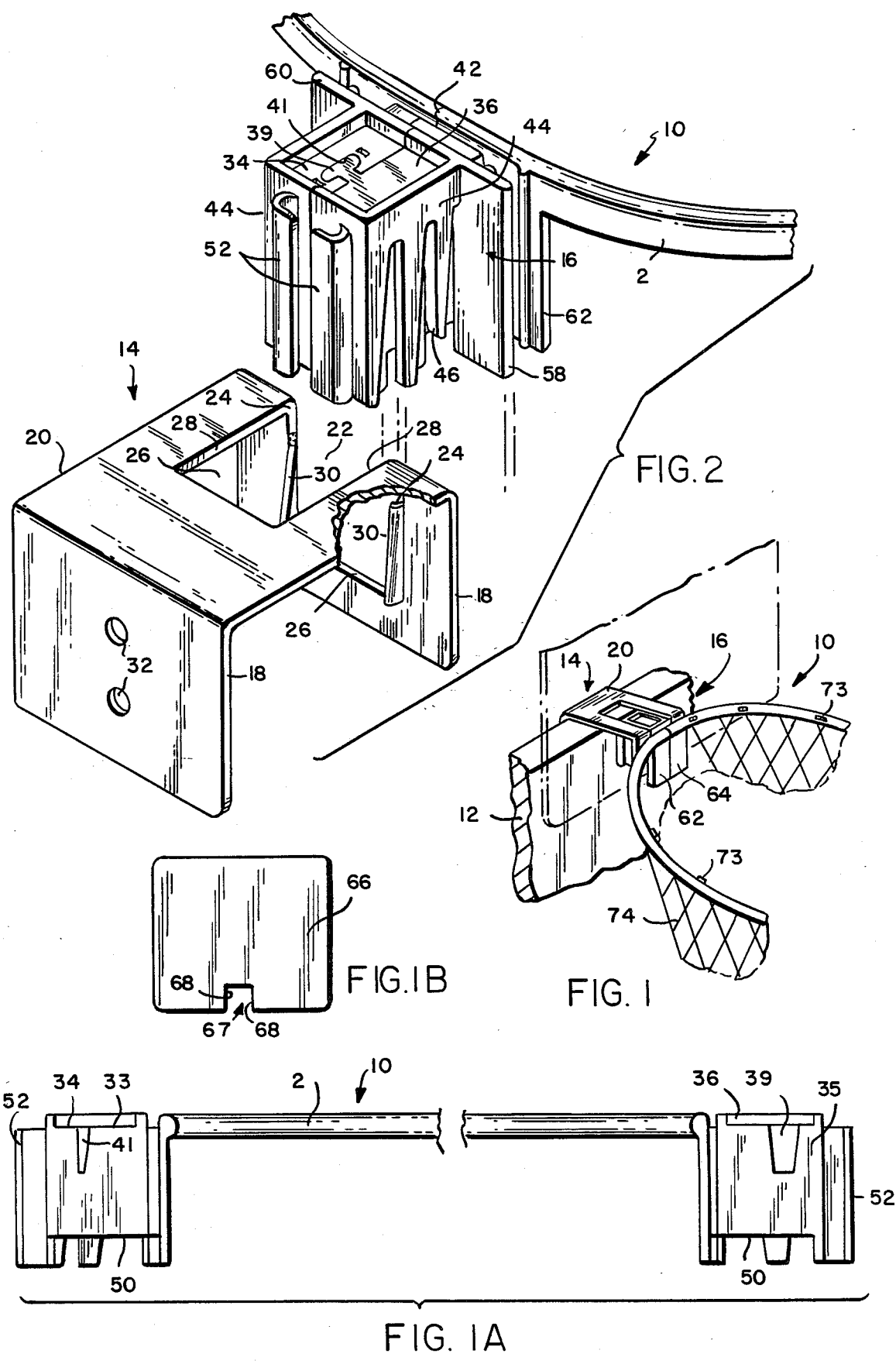

4,887,812

BASKETBALL HOOP SYSTEM

BACKGROUND OF THE INVENTION

Basketball hoops are generally fastened to a backboard mounted to an upright such as a post or a wall by means of a bracket. Such installations are relatively expensive and not appropriate for use within the home. It is the purpose of this invention to provide a basketball hoop and a mounting therefor which is inexpensive and can be used in the home, for example, to support the hoop from the upper edge of a door or other elevated horizontal structures such as beams. Desirably, the mounting should be such as to enable adjusting the position of the hoop relative to the face of the support. Further, it is desirable to construct the hoop and bracket of an inexpensive moldable material such as plastic.

SUMMARY OF THE INVENTION

As herein illustrated, the invention resides in the combination of a basketball hoop, means for mounting the hoop to a supporting structure comprising a bracket for attachment to the support, a coupling for attaching the hoop to the bracket, a backboard and means associated with the coupling for receiving and supporting the backboard in a position perpendicular to the hoop at the place of attachment of the hoop to the coupling. The coupling for receiving and supporting the backboard comprises transversely-spaced, vertically-disposed grooves and the backboard is provided with transversely-spaced, vertically-disposed edges for engagement with the grooves. The grooves are defined by spaced, parallel, vertically-disposed flanges for receiving the transversely-spaced, vertically-disposed edges of the backboard and the opposed faces of the flanges are provided with vertically-disposed ribs for engagement with the vertically-disposed edges of the backboard. The bracket comprises a U-shaped hanger defining spaced, parallel legs, spaced apart a distance greater than the thickness of the support for mounting astride the support and there is means adjustably mounting the coupling element to one leg of the hanger for adjustment relative to the other leg of the hanger for clamping engagement with the support. The coupling element embodies recesses for selectively receiving said one leg at different distances from the other leg to enable adjusting the coupling element relative to the other leg for supports of varying thickness. There is elastically-yieldable means at the distal end of the coupling element opposite the other leg for engagement with the support to which the hanger is mounted to clamp the bracket and coupling element to the support. The hoop is divided such as to have opposed ends and the coupling element comprises blocks at the respective ends of the hoop interengageable to hold the opposite ends in abutting engagement with each other. The blocks have opposed parallel surfaces which embody, respectively, a groove and tongue interengageable to hold the blocks in abutting engagement and the groove is provided with locking means for locking the tongue within the groove when the latter is engaged with the groove.

The invention will now be described in greater detail with reference to the accompanying drawings, wherein:

FIG. 1 is a fragmentary perspective showing a basketball hoop mounted by means of a bracket constructed according to this invention to the upper edge of a door or other upright structure;

FIG. 1A is an elevation of the hoop prior to bending to circular configuration;

FIG. 1B is an elevation of the backboard shown in dot and dash lines in FIG. 1;

FIG. 2 is an enlarged perspective of the component parts of the supporting structure for supporting the basketball hoop;

Figure 3:
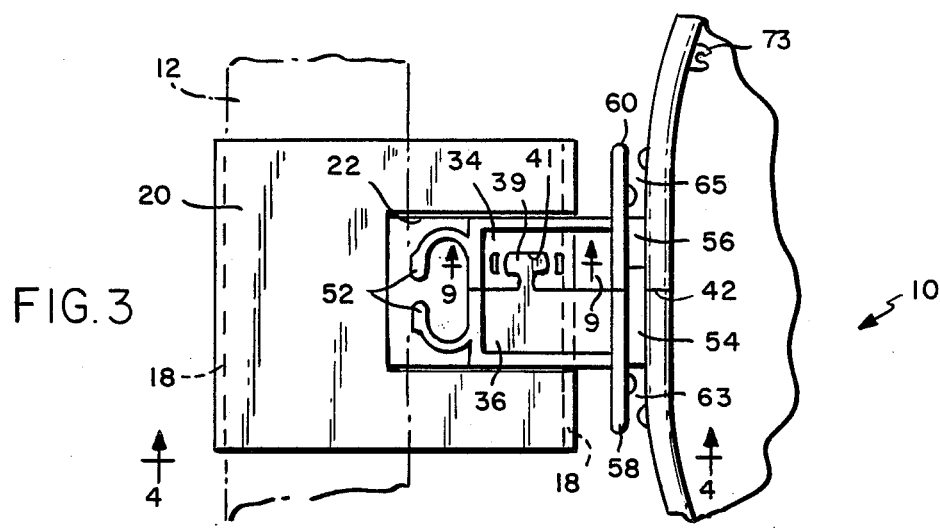
FIG. 3 is a plan view of the supporting structure.

Referring to the drawings, FIG. 1, there is shown in perspective a basketball hoop 10 mounted to a vertically-disposed structure 12 which may, for example, be a door by means of a U-shaped hanger 14 and coupling means 16. While the supporting structure shown in FIG. 1 is the upper edge of a door, a horizontal beam elevated from the floor could be used equally well as, for example, beams in the basement or the attic.

Referring specifically to FIG. 2, the U-shaped hanger 14 comprises spaced, parallel legs 18—18 joined by a horizontal bridge piece 20. Hanger 14 may be comprised of metal or plastic. One leg 18 of the hanger contains an opening 22 disposed symmetrically with respect to the opposite edges of the leg 18 which defines spaced, parallel, vertically-disposed edges 24—24 and a horizontally-disposed edge 26. A pair of triangular-shaped tongues 30—30 are formed along the edges 24—24 and extending inwardly therefrom. The bridge piece 20 contains a rectangular opening 26 defined by spaced, parallel edges 28—28. The opening 26 corresponds in width to the opening 22. The opposite leg 18 may be provided with vertically-spaced openings 32—32 for receiving fastening means for securing it to the support structure. The hanger is structured to provide for mounting it to the upper edge of a door panel or other vertically-disposed panel or beam. Desirably, the distance between the legs is great enough to accommodate doors and/or panels of a variety of thicknesses.

Figure 4:
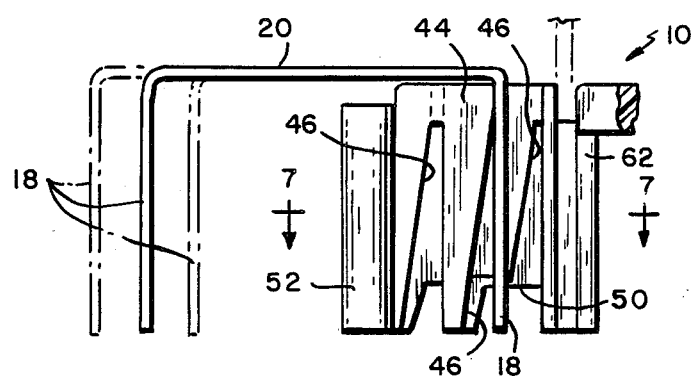
FIG. 4 is an elevation taken on the line 4—4 of FIG. 3 with the bracket engaged with the coupling element.
Figure 5:
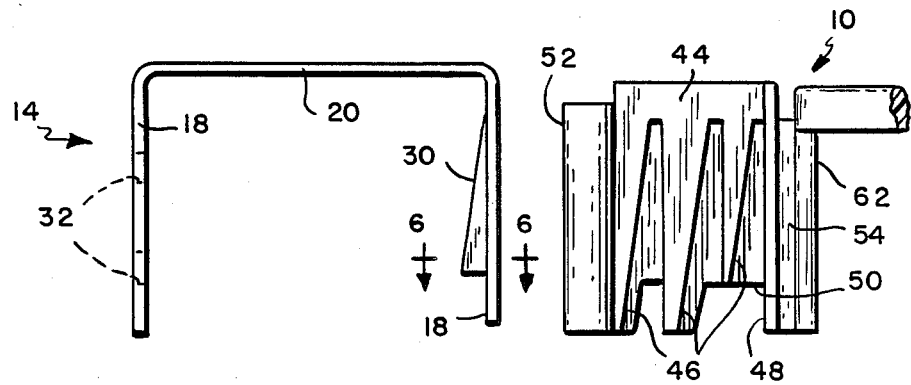
FIG. 5 is an elevation of the coupling element and bracket separated from each other.
Figure 6:
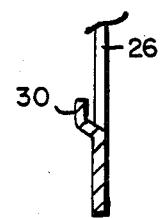
FIG. 6 is a fragmentary section taken on the line 6—6 of FIG. 5.
Figure 7:
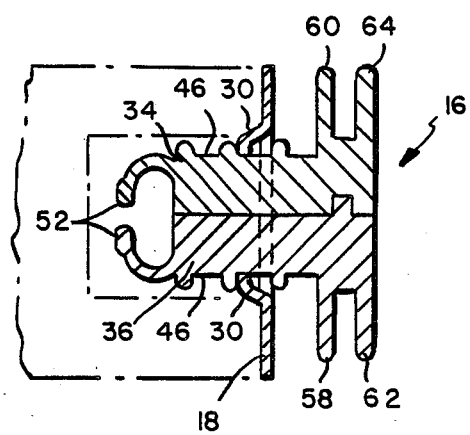
FIG. 7 is a section taken on the line 7—7 of FIG. 4.

The hoop 10 is comprised of an elongate strip of flexible material 2, as shown in FIG. 1A, which can be bent into circular configuration, provided at its opposite ends with integrally-formed coupling elements 34,36 for connecting the ends of the hoop to each other. The elements 34 and 36, when engaged, comprise the coupling means 16 for detachably mounting the hoop 10 to the hanger 14, FIG. 1, and is of a transverse width to fit snugly into the openings 22 and 26. In order to retain the coupling means 16 in the hanger 14, the coupling means has in its opposite faces 44—44 a plurality of grooves 46, there being three such grooves as shown in FIGS. 4, 5 and 7. The grooves are of generally triangular configuration, FIGS. 4 and 5, and are dimensioned to telescopically fit into the triangular-shaped tongues 30—30. The several grooves 46 enable mounting the coupling element at different positions on the U-shaped hanger with respect to the leg opposite the openings 22,26. This provides for mounting the coupling element 16 to supporting structures of different width. The lower end of the coupling element 16 is provided with notches 48 which define horizontal edges 50 for engagement with the horizontal edge 26 of the hanger.

Figure 8:
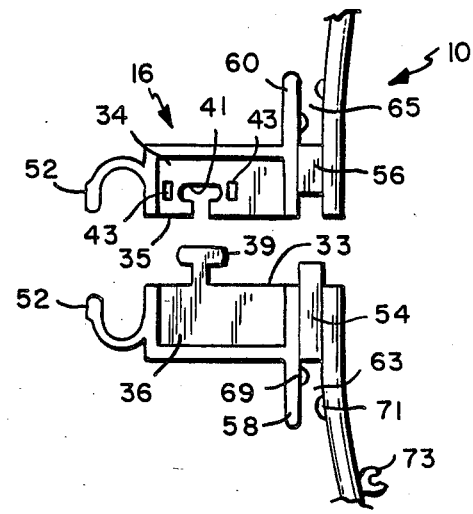
FIG. 8 is a plan view of the coupling element showing the component parts thereof separated.
Figure 9:
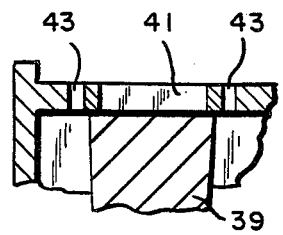
FIG. 9 is an enlarged fragmentary section taken on the line 9—9 of FIG. 3.

A pair of elastically-yieldable, vertically-disposed, channel-shaped members 52—52, FIGS. 3 and 8, are formed integral with the coupling elements 34,36 and so disposed that when the coupling means 16 is inserted into the opening 22 of the hanger, they engage the support 12 and thus yieldably engage the coupling means 16 and hanger 14 with the opposite sides of the support structure 12. The coupling elements 34,36, FIG. 1A, connecting the opposite ends of the hoop to each other have flat surfaces 33,35, FIG. 8, which embody, respectivley, a locking tongue 39 and a locking groove 41. The locking tongue 39 is tapered from its upper end downwardly to its lower end and at its upper end is slightly wider than the upper end of the locking groove 41. At the upper end of the locking groove 41, there are apertures 43—43 which permit displacement of the upper end of the groove 41 when the wedge-shaped tongue 39 is pressed downwardly into the groove. Just below the upper end of the groove 41, the latter is enlarged to receive the upper end of the locking tongue 39 for locking engagement with the groove.

The coupling elements 34,36 are integrally connected with the ends of the hoop by way of spacers 54,56, FIGS. 3 and 8. At the outer sides of the coupling elements 34,36, there are vertically-disposed flanges 58,60. Opposite the flanges 58,60, there are vertically-disposed flanges 62,64 formed integral with the ends of the hoop 10 which face the flanges 58,60 and define therewith transversely-spaced, vertically-disposed grooves 63,65. The grooves 63,65 are disposed to receive the lower edge of a backstop card 66, FIG. 1A, and to support the latter above the hoop in a substantially perpendicular position. As illustrated, FIG. 1B, the backstop card 66 is generally rectangular and has at its lower edge a rectangular opening 67 defining spaced, parallel, vertically-disposed edges 68—68 for engagement with the grooves 63,65. In order to retain the card firmly in position, ribs 69,71 are formed on the flanges in offset relation to each other with ribs extending from the upper to the lower ends of the flanges.

Nubs 73 are formed in the inner sides of the hoop 10 for supporting a net 74 in suspense from the hoop.

The structure as thus described can be comprised of metal or plastic and is adapted to be easily applied to existing structure such as the upper edge of a door without alteration or defacement thereof.

It should be understood that the present disclosure is for the purpose of illustration only and includes all modifications or improvements which fall within the scope of the appended claims.

What is claimed is:

1. A basketball hoop and means for mounting the hoop to a support comprising a bracket for attachment to the support, a coupling element attached at one end to the hoop for detachably mounting the hoop to the bracket, said bracket comprising a U-shaped hanger defining spaced, parallel legs spaced apart a distance greater than the thickness of the support for mounting astride the support and means adjustably mounting the coupling element to one leg of the hanger for adjustment relative to the other leg of the hanger for clamping engagement with the support.

2. A basketball hoop and means for mounting the hoop to a support according to claim 1 wherein said coupling element embodies spaced recesses for selectively receiving said one leg at different distances from the other leg to enable adjusting the coupling element relative to said other leg for supports of varying thickness.

3. A basketball hoop and means for mounting the hoop to a support according to claim 2 wherein the coupling element is a vertically-elongate block of rectangular, horizontal cross section defining spaced, parallel, vertical sides and the recesses are formed in pairs in the sides at different radial distances from the center of the hoop.

4. A basketball hoop and means for mounting the hoop to a support according to claim 3 wherein the hoop is attached to one vertical side of the block and a pair of elastically-yieldable means are attached to the other vertical side of the block.

5. A basketball hoop and means for mounting the hoop to a support according to claim 4 wherein the elastically-yieldable means comprise transversely-spaced, vertically-disposed, channel shaped members attached at one edge to the block with their other edges extending in spaced, parallel relation such that said other edges are yieldable relative to said block.

6. A basketball hoop and means for mounting the hoop to a support according to claim 1 wherein there is elastically-yieldable means at the distal end of the coupling element opposite said other leg for engagement with the support to which the hanger is mounted.

7. A basketball hoop and means for mounting the hoop to a support according to claim 1 wherein said one leg of the hanger embodies spaced, parallel, vertical edges and said coupling element contains spaced, parallel, vertical recesses for detachably receiving said edges.

8. A basketball hoop and means for mounting the hoop to a support according to claim 7 wherein the coupling element has pairs of spaced, parallel vertical recesses for receiving the edges of said hanger.

9. A basketball hoop and means for mounting the hoop to a support according to claim 7 wherein the edges of said one leg of the hanger embody flanges which diverge with respect to said edges for frictional engagement said the recesses.

10. A basketball hoop and means for mounting the hoop to a support according to claim 9 wherein the recesses have downwardly-diverging sides and said flanges have downwardly-diverging edges for interengagement with the recesses.

11. A basketball hoop and means for mounting the hoop to a support according to claim 1 wherein said one leg has an opening therein defined by spaced, parallel, vertical edges and a horizontal edge joining the lower ends of the vertical edges and the coupling element is dimensioned to be received within said opening with its opposite edges interengaged with the vertical edges and its lower edge resting on the horizontal edge.

12. A basketball hoop and means for mounting the hoop to a support according to claim 11 wherein the hanger has at the top at its junction with one leg an opening for accommodating the coupling element for adjustment therein relative to the other leg.

13. A basketball hoop and means for mounting the hoop to a support according to claim 12 wherein said other leg of the hanger has openings therein for receiving attaching elements such as screws for securing the hanger to the support.

14. A basketball hoop and coupling element for detachably mounting the hoop to a hanger, said hoop being divided such as to have opposed ends and said coupling element comprising blocks at the respective ends of the hoop interengageable to hold the opposite ends in abutting engagement with each other.

15. A basketball hoop and coupling element according to claim 14 wherein said blocks have opposed parallel surfaces which embody, respectively, a groove and tongue interengageable to hold the blocks in abutting engagement with each other.

16. A basketball hoop and coupling element according to claim 15 wherein the groove is provided with locking means for locking the tongue within the groove when the latter is engaged within the groove.

17. A basketball hoop and coupling element according to claim 15 wherein there are transversely-spaced, yieldable locking elements at the upper end of the groove disposed at a spacing less than the width of the tongue and the tongue has diverging edges such as to displace the locking elements to admit the tongue into the groove below the locking element such that the locking elements resume their initial spacing following interengagement of the tongue within the groove.

18. A basketball hoop and means for mounting the hoop to a support comprising a bracket for attachment to the support, a coupling for attaching the hoop to the bracket, a backboard embodying transversely-spaced, vertically-disposed edges and means associated with the coupling for receiving and support said backboard in a position perpendicular to the hoop at the place of attachment of the hoop to the coupling, wherein the means associated with the coupling element for receiving and supporting the backboard comprises transversely-spaced, vertically-disposed grooves, said grooves being defined by spaced, parallel, vertically-disposed flanges for receiving said transversely-spaced, vertically-disposed edges of the backboard and wherein the opposed faces of the flanges are provided with vertically-disposed ribs.

19. A basketball hoop and means for mounting the hoop to a support according to claim 18 wherein said ribs are transversely offset.

* * * * *